(12) United States Patent
Tokuda

(10) Patent No.: US 10,127,924 B2
(45) Date of Patent: Nov. 13, 2018

(54) COMMUNICATION APPARATUS MOUNTED WITH SPEECH SPEED CONVERSION DEVICE

(71) Applicant: Panasonic Intellectual Property Management Co., Ltd., Osaka (JP)

(72) Inventor: Toshimichi Tokuda, Fukuoka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/496,900

(22) Filed: Apr. 25, 2017

(65) Prior Publication Data

US 2017/0345444 A1 Nov. 30, 2017

(30) Foreign Application Priority Data

May 31, 2016 (JP) .................... 2016-109561

(51) Int. Cl.
*G10L 21/043* (2013.01)
*G10L 21/0364* (2013.01)
*G10L 21/038* (2013.01)
*G10L 21/057* (2013.01)
*G10L 25/78* (2013.01)
(Continued)

(52) U.S. Cl.
CPC .......... *G10L 21/043* (2013.01); *G10L 21/038* (2013.01); *G10L 21/0364* (2013.01); *G10L 21/057* (2013.01); *G10L 25/78* (2013.01); *H04M 1/642* (2013.01); *G10L 25/90* (2013.01); *G10L 2021/0135* (2013.01); *G10L 2025/783* (2013.01); *H04M 1/6016* (2013.01); *H04M 1/6505* (2013.01)

(58) Field of Classification Search
CPC ..................................... G10L 21/043
USPC .......... 348/220.1; 379/46, 81.1, 349, 88.02; 381/106; 455/566; 704/208, 210, 211, 704/219, 226, 260, 500, 209, 272; 709/206, 246; 370/468
See application file for complete search history.

(56) References Cited

U.S. PATENT DOCUMENTS 5,546,395 A * 8/1996 Sharma .................. G10L 19/06 370/468
5,623,539 A * 4/1997 Bassenyemukasa .... H04M 1/66 379/114.14

(Continued)

FOREIGN PATENT DOCUMENTS

JP 5346230 B2 11/2013

*Primary Examiner* — Gerald Gauthier
(74) *Attorney, Agent, or Firm* — Seed IP Law Group LLP

(57) ABSTRACT

In a communication apparatus, an encoder compresses telephone call voice which is transmitted from another communication apparatus. A voice accumulator preserves the telephone call voice, which is compressed by the encoder, as a message. A decoder expands the telephone call voice which is preserved in the voice accumulator. A signal memory temporarily maintains the telephone call voice which is expanded by the decoder. A speech speed convertor performs speech speed conversion on the telephone call voice, which is read from the signal memory, and outputs resulting voice from a speaker. A memory monitor temporarily stops to expand the telephone call voice in the decoder in a case where the memory monitor determines that an idle capacity of the signal memory approaches a predetermined lower limit value.

5 Claims, 12 Drawing Sheets

(51) Int. Cl.
  *H04M 1/64* (2006.01)
  *G10L 21/013* (2013.01)
  *H04M 1/60* (2006.01)
  *H04M 1/65* (2006.01)
  *G10L 25/90* (2013.01)

(56) References Cited

U.S. PATENT DOCUMENTS

| | | | | |
|---|---|---|---|---|
| 5,717,818 A * | 2/1998 | Nejime | ................... | G10L 21/04 381/23.1 |
| 5,995,925 A * | 11/1999 | Emori | ................... | G10L 21/04 704/208 |
| 6,104,998 A * | 8/2000 | Galand | ................ | G10H 1/0066 370/352 |
| 6,111,605 A * | 8/2000 | Suzuki | ............... | H04N 1/00129 348/220.1 |
| 6,151,571 A * | 11/2000 | Pertrushin | ............... | G10L 17/26 704/207 |
| 6,275,806 B1 * | 8/2001 | Pertrushin | ............... | G10L 17/26 704/270 |
| 6,731,723 B1 * | 5/2004 | Garey | ................. | H04M 1/6505 379/88.1 |
| 7,711,856 B1 * | 5/2010 | Lin | ........................ | H04M 3/533 709/246 |
| 2001/0047267 A1 * | 11/2001 | Abiko | ..................... | G10L 21/04 704/500 |
| 2006/0293883 A1 * | 12/2006 | Endo | ....................... | G10L 21/04 704/219 |
| 2007/0192089 A1 * | 8/2007 | Fukuda | ................... | G10L 21/04 704/210 |
| 2007/0203703 A1 * | 8/2007 | Yoshida | ................. | G10L 13/07 704/260 |
| 2007/0269056 A1 * | 11/2007 | Nakamura | .............. | G10L 21/04 381/106 |
| 2011/0258267 A1 * | 10/2011 | Tozaki | ............... | G01C 21/3697 709/206 |
| 2012/0163562 A1 * | 6/2012 | Takuno | ................ | G08B 25/014 379/46 |
| 2016/0072944 A1 * | 3/2016 | Noda | ................... | H04M 1/72519 455/566 |
| 2016/0099006 A1 * | 4/2016 | Isaka | ................... | G10L 21/0208 704/226 |
| 2017/0345444 A1 * | 11/2017 | Tokuda | ................ | G10L 21/043 |

\* cited by examiner

COMMUNICATION APPARATUS MOUNTED WITH SPEECH SPEED CONVERSION DEVICE

BACKGROUND

1. Technical Field

The present disclosure relates to a communication apparatus mounted with a speech speed conversion device that receives a telephone call voice signal transmitted from a communication apparatus of a telephone call partner, converts a speech speed in a voice section of the voice signal, and outputs a resulting voice signal.

2. Description of the Related Art

A speech speed conversion device has, for example, a function of expanding the telephone call voice signal (that is, a voice signal on a voice reception side) transmitted from a telephone apparatus of a telephone call partner at a regular rate in a time direction and converting the telephone call voice signal into voice in which the telephone call partner speaks slowly and a listener easily listens.

In a speech speed conversion device disclosed in Japanese Patent No. 5346230, a voice section, in which an input signal includes voice, and a non-voice section, in which the input signal does not include voice, are determined, an expansion process is performed in a case where it is determined to be the voice section, and a compression process is performed in a case where it is determined to be the non-voice section. In addition, the speech speed conversion device does not perform the compression process in a case where a level of noise included in the input signal is equal to or higher than a prescribed threshold value even though it is determined to be the non-voice section. Therefore, it is possible for the speech speed conversion device to prevent output voice from being interrupted because the input voice is erroneously compressed.

However, speech speed conversion is performed in such a way that the input voice signal (input signal) is once accumulated in a signal memory and a past signal is read at a speed which is slow compared to the input signal.

In a case where the speech speed conversion device is mounted on a telephone with an automatic answering function and an automatic answering telephone message, which is accumulated as automatic answering, is reproduced at a slow speed, an idle capacity of the signal memory (voice buffer) of a speech speed convertor is ran out if the automatic answering telephone message is long. That is, in a case where the speech speed conversion is continued for a long time, delay between input and output increases, and thus the idle capacity of the signal memory is ran out.

As a result, the speech speed conversion is not performed until the idle capacity of the signal memory increases, and thus an advantage of the speech speed conversion is reduced. In this case, for example, a user listens to voice reception at a normal reproduction speed without performing the speech speed conversion from the middle, and thus the user becomes hard to listen and feels discomfort for a change in the voice speed of the voice reception. Particularly, in a case where the user listens to the automatic answering by voice, there may be a case in which the automatic answering voice is provided for a long time depending on an issue. Therefore, it is assumed that the idle capacity of the signal memory decreases, and thus the above situation is easily generated. In contrast, in a case where the capacity of the signal memory increases, the costs rise.

SUMMARY

A main object of the present disclosure is to perform speech speed conversion on long-time automatic answering voice even in a case where a signal memory has a small capacity.

According to the present disclosure, there is provided a communication apparatus mounted with a speech speed conversion device, which is a telephone apparatus that makes a telephone call with another telephone apparatus through a telephone switching network, including: a compressor that compresses telephone call voice which is transmitted from another telephone apparatus; an automatic answering telephone message preserver that preserves the telephone call voice, which is compressed by the compressor, as an automatic answering telephone message; an expander that expands the telephone call voice which is preserved in the automatic answering telephone message preserver; a speech speed convertor that includes a voice buffer, which temporarily maintains the telephone call voice expanded by the expander, and that performs speech speed conversion on the telephone call voice, which is read from the voice buffer, and outputs resulting voice from a speaker; and a monitor that temporarily stops to expand the telephone call voice in the expander in a case where the monitor determines that an idle capacity of the voice buffer approaches a predetermined lower limit value. According to the communication apparatus mounted with the speech speed conversion device of the present disclosure, it is possible to perform speech speed conversion on long-time automatic answering voice even in the case where a signal memory has a small capacity.

BRIEF DESCRIPTION OF THE DRAWINGS

FIG. 7A is a timing chart illustrating a change in received voice acquired before and after a voice switch is turned on;

FIG. 7B is a timing chart illustrating the change in the received voice acquired before and after the voice switch is turned on;

DETAILED DESCRIPTION

Figure 1:
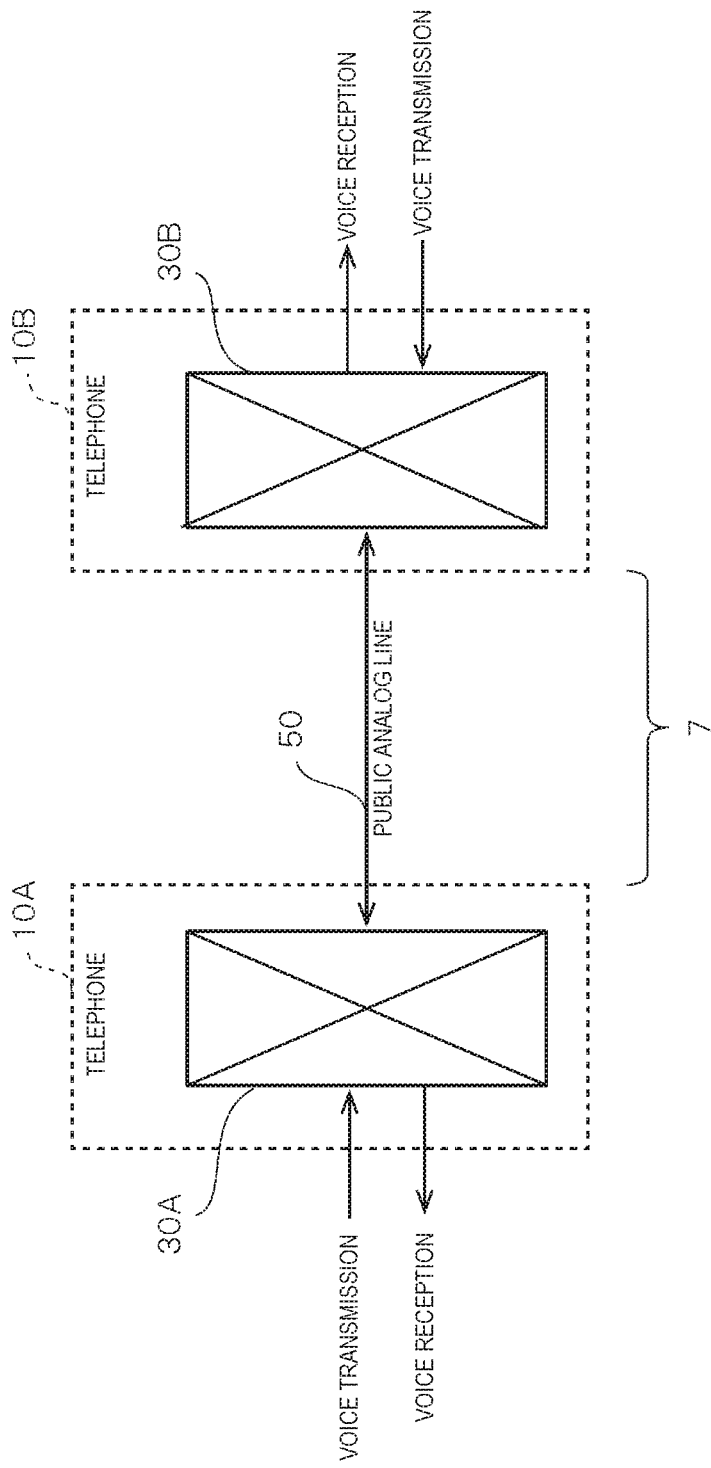
FIG. 1 is a diagram illustrating connection between telephones according to a first embodiment.

Hereinafter, embodiments of the present disclosure will be described with reference to the accompanying drawings.
Details And Problems of First Embodiment A speech speed conversion device has a function of converting an original voice into voice which is similar to voice acquired in a case where a talker speaks slowly by expanding a voice signal on a voice reception side in a time direction. In a case where the configuration of the speech speed conversion device disclosed in PTL 1 is applied to a telephone apparatus which is used for a real-time telephone call, problems as below may be considered. In the real-time telephone call, generally, conversation is performed between a telephone apparatus of a user and a telephone apparatus of a telephone call partner in a time division manner. That is, the telephone call partner listens to content of conversation content in a case where the user makes the conversation, and the user listens to content of conversation in a case where the telephone call partner makes the conversation. In a case of transmission and reception of telephone call voice between the telephone apparatuses in a case of the real-time telephone call, a line echo is generated based on a two-wire/four-wire conversion circuit generally provided in the telephone. Therefore, it is conceivable that, for example, line echo components of sound (that is, transmitted voice), acquired in such a way that the user makes a telephone call, enter a circuit of the telephone apparatus on the voice reception side, the line echo components may be listened from a speaker provided in the circuit on the voice reception side, and thus the line echo components become noise and interfere the telephone call.

In addition, in a case where, for example, a voice switch is mounted on the telephone apparatus in order to prevent noise due to line echo components from being generated, it is possible to reduce a voice reception signal which includes a voice signal and a noise signal in case of voice transmission of the user of the telephone apparatus. However, a level of the noise signal included in the received voice is changed due to ON/OFF of the voice switch. As a result, there is a case where the speech speed conversion device provided in the telephone apparatus erroneously detects a change in the level of the noise signal as voice. For example, the voice switch stops attenuation of the voice reception signal in a case where the user ends voice transmission. Therefore, in a case where the level of noise increases due to the line echo component according to OFF of the voice switch, the speech speed conversion device determines the signal as the received voice signal, and thus it is difficult to normally detect a voice section (see FIG. 7B).

Accordingly, in a case where the speech speed conversion device erroneously detects the voice section, it is difficult to appropriately perform speech speed conversion on the voice section included in the voice reception signal, and thus the speech speed conversion is also performed on noise in a non-voice section. As a result, it is difficult to listen to voice reception as time unnecessary for the speech speed conversion exists, and thus an advantage of the speech speed conversion is reduced. In addition, an influence is given in that voice is interrupted.

Here, in a first embodiment, an example of a telephone apparatus will be described which prevents the voice section included in the voice reception signal from being erroneously detected and is capable of effectively performing speech speed conversion in which the user is easy to listen.

Hereinafter, each embodiment which specifically discloses a telephone apparatus according to the present disclosure will be described in detail with appropriate reference to the accompanying drawings. Here, there is a case where unnecessarily detailed description is omitted. For example, there is a case where detailed description of an already well-known item or repeated description for substantially the same configuration is omitted. The reason for this is to avoid the following description being unnecessarily redundant and to make those skilled in the art easily understand. Meanwhile, the accompanying drawings and the following description are provided to make those skilled in the art sufficiently understand the present disclosure, and it is not intended to limit subject matters disclosed in the claims by the accompanying drawings and the following description.
First Embodiment FIG. 1 is a diagram illustrating connection between telephones 10A and 10B according to the first embodiment. Telephone 10A and telephone 10B as examples of the telephone apparatus according to the present disclosure are connected to be able to make a telephone call with each other through telephone switching network 7 which includes public analog line 50.

Telephone 10A includes two-wire/four-wire conversion circuit 30A which has a role as an exchange. Two-wire/four-wire conversion circuit 30A converts total four-wire signals for each two wires into two-wire signals of earth and a signal line, for a microphone and a speaker (see later) in telephone 10A, respectively with plus and minus. Two-wire/four-wire conversion circuit 30A is connected to public analog line 50.

Similarly, telephone 10B includes two-wire/four-wire conversion circuit 30B which has a role as an exchange. Two-wire/four-wire conversion circuit 30B converts total four-wire signals for each two wires into two-wire signals of earth and a signal line, for a microphone and a speaker (see later) in telephone 10B, respectively with plus and minus. Two-wire/four-wire conversion circuit 30B is connected to public analog line 50. Two-wire/four-wire conversion circuits 30A and 30B are connected to public analog line 50 by two wires.

Telephones 10A and 10B according to the embodiment are fixed telephones which are connected to public analog line 50 that generally comes into wide use.

Meanwhile, in a case where it is not necessary to particularly distinguish between telephones 10A and 10B, there is a case where telephones 10A and 10B are simply referred to as telephone 10. In addition, in a case where it is not necessary to particularly distinguish between two-wire/four-wire conversion circuits 30A and 30B, there is a case where two-wire/four-wire conversion circuits 30A and 30B are simply referred to as two-wire/four-wire conversion circuit 30.

In addition, the above-described exchange may be a private branch exchange (PBX) which is installed in, for example, an office or the like of a company and exchanges an extension telephone and an outside line telephone. In this case, a business telephone which is connected to the private branch exchange is used as the telephone. Although a case where a telephone call is made using the public analog line is assumed in the embodiment, the present disclosure may be applied to a case where a telephone call is made using a digital line, similarly.

Figure 2:
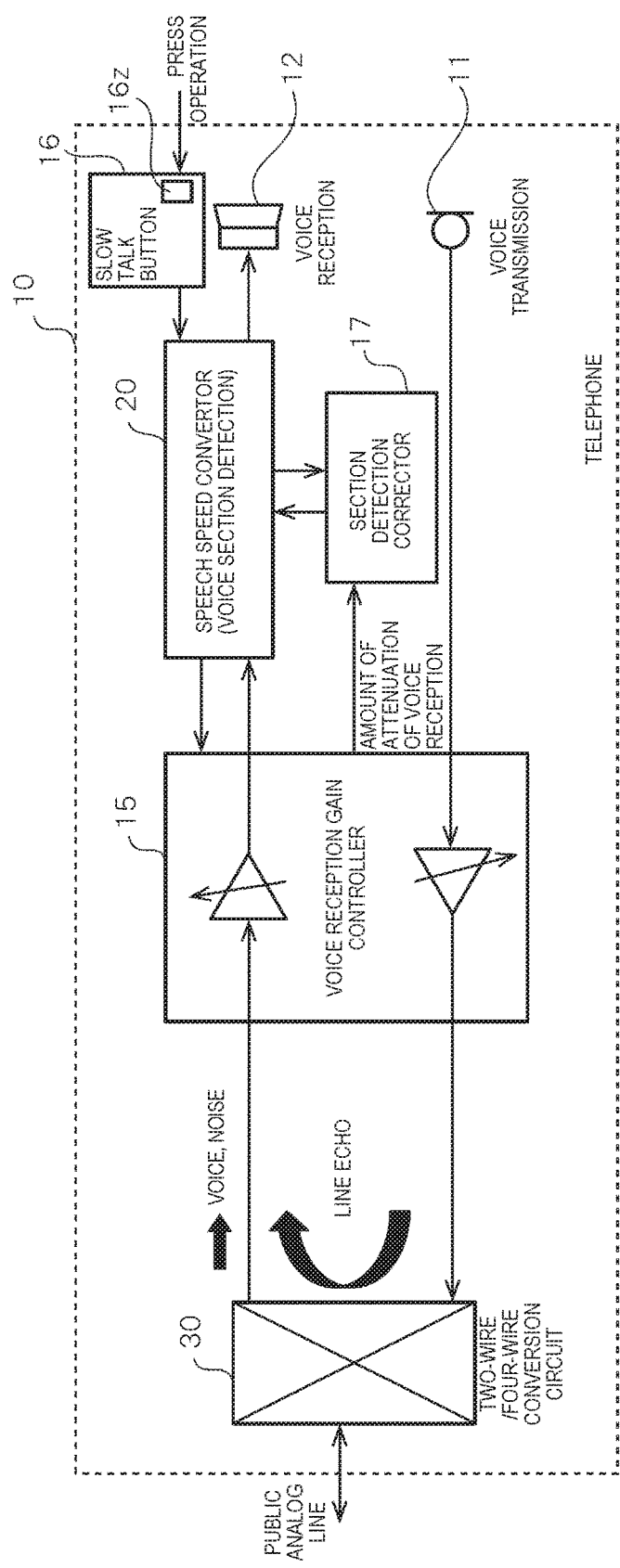
FIG. 2 is a diagram illustrating an example of an internal configuration of components, which are connected to a two-wire/four-wire conversion circuit and are related to speech speed conversion, of a telephone in detail.

FIG. 2 is a diagram illustrating an example of an internal configuration of components, which are connected to two-wire/four-wire conversion circuit 30 and are related to speech speed conversion, of telephone 10 in detail. Telephone 10 illustrated in FIG. 2 is formed to include microphone 11, speaker 12, voice reception gain controller 15, section detection corrector 17, slow-talk button 16, and speech speed convertor 20.

Microphone 11 acquires and inputs voice of a user (that is, voice on a voice transmission side) who uses telephone 10.

Speaker 12 outputs voice (that is, voice on a voice reception side) which is included in a signal transmitted from telephone 10 of a telephone call partner.

Voice reception gain controller 15 controls attenuation of a level of a voice reception signal of telephone 10, acquired when the voice of the user is transmitted, using, for example, any one of the voice switch, a center clipper, and an Auto Gain Control (AGC). The voice reception signal includes a line echo component signal based on two-wire/four-wire conversion circuit 30 and, further, a voice signal and a noise signal.

For example, the voice switch determines whether or not voice transmission exists in telephone 10, switches between voice transmission and voice reception, and attenuates a level of the voice reception signal in a case where it is determined that voice transmission exists.

The center clipper sets the level of the voice reception signal to approximately a value of 0 in a case where voice transmission is performed in telephone 10.

In a case where the voice on a voice transmission side is large in telephone 10, the AGC decreases the level of the voice reception signal according to volume.

Voice reception gain controller 15 outputs the amount of attenuation on the voice reception side to section detection corrector 17 if necessary.

Section detection corrector 17 as an example of a threshold corrector corrects a threshold, which is used for voice section detection performed by speech speed convertor 20, based on information relevant to the amount of attenuation of the voice reception signal acquired from voice reception gain controller 15. For example, there are three methods for correcting a threshold which is used for voice section detection. The threshold is set using, for example, a noise level which is a long-time average AvL (see FIG. 5) of the voice reception signal. The long-time average AvL of the voice reception signal is derived and acquired by noise level estimator $21z$.

In a first correction method, section detection corrector 17 sets the threshold by multiplying the long-time average AvL of the noise level, which is estimated by noise level estimator $21z$, by the amount (gain) of attenuation of voice reception which is acquired by voice reception gain controller 15. That is, according to the first correction method, the threshold decreases according to the amount of attenuation of the voice reception signal.

In a second correction method, section detection corrector 17 provides a control signal, which instructs to amplify the voice reception signal according to the amount of attenuation while the voice reception signal is being attenuated by voice reception gain controller 15, to voice section detector 21. Signal amplifier $21x$ of voice section detector 21 amplifies the input voice reception signal according to the control signal from section detection corrector 17, and estimates a noise level from the voice reception signal acquired after amplification. That is, according to the second correction method, the threshold is set by the estimated noise level which is included in the amplified voice reception signal.

In a third correction method, section detection corrector 17 does not estimate the noise level using noise level estimator $21z$ of voice section detector 21 while the voice reception signal is being attenuated by voice reception gain controller 15. That is, according to the third correction method, the threshold is set to a predetermined noise level (that is, the long-time average AvL of the voice reception signal illustrated in FIG. 5). However, "predetermined" does not mean "fixed". Since there is a case where the noise level is changed according to voice reception environments, the predetermined noise level means a noise level which is derived on each occasion.

Each of the first and second correction methods is performed in a case where voice reception gain controller 15 is formed using, for example, either the center clipper or the AGC.

The third correction method is performed in a case where voice reception gain controller 15 is formed using, for example, the voice switch.

In a case where correction is performed using the first correction method, section detection corrector 17 outputs a control signal, which instructs to use a threshold acquired by multiplying the long-time average AvL of the noise level by the amount (gain) of attenuation of voice reception, that is, acquired after change, to speech speed convertor 20.

In a case where correction is performed using the second correction method, section detection corrector 17 outputs a control signal, which instructs to use the noise level included in the voice reception signal acquired before attenuation is performed by voice reception gain controller 15 as the threshold, to speech speed convertor 20. As described above, the control signal includes an instruction to perform amplification such that a signal level acquired after attenuation becomes a noise level acquired before the attenuation according to the amount of attenuation of the voice reception signal by voice reception gain controller 15.

Figure 5:
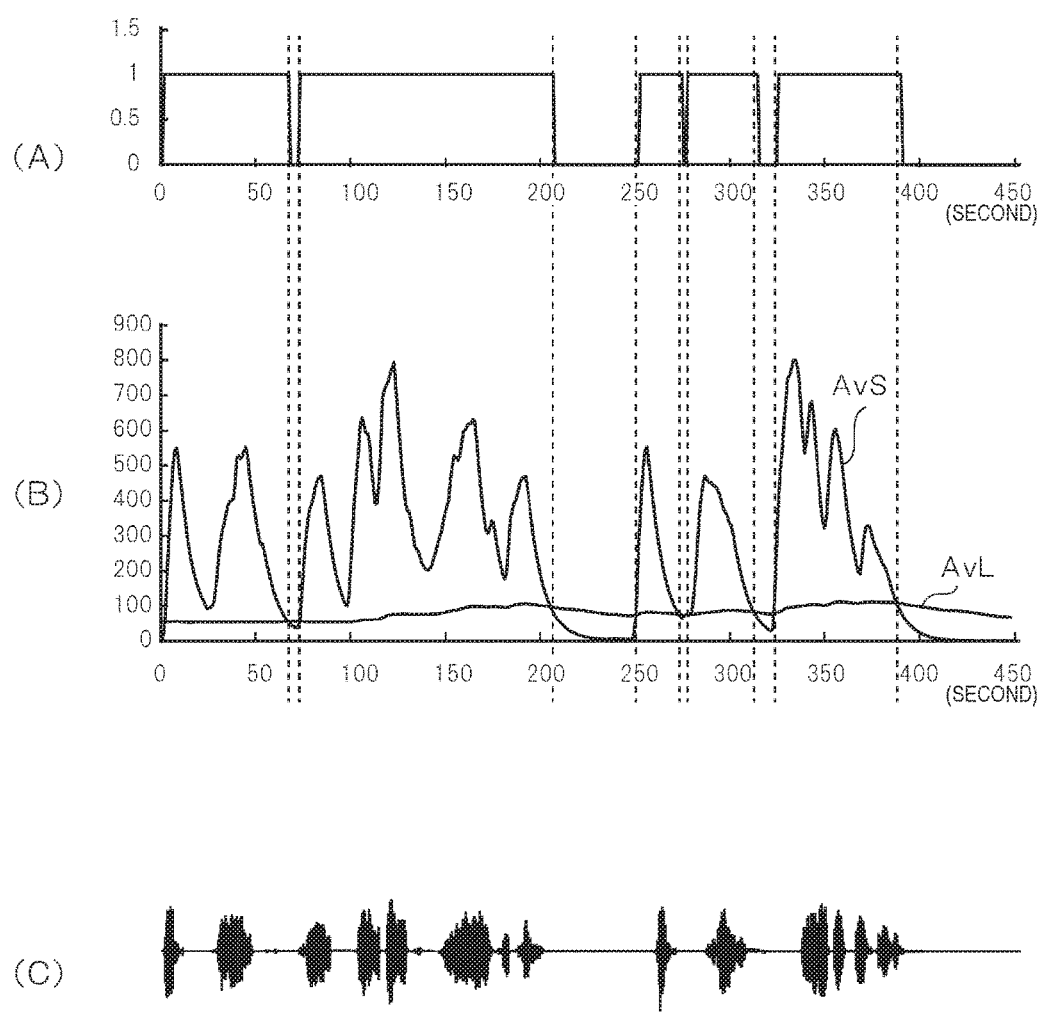
FIG. 5 is a view illustrating a method of detecting a voice section.

In a case of the third correction method, section detection corrector 17 outputs a control signal to instruct to use a predetermined threshold (that is, the long-time average AvL of the voice reception signal illustrated in FIG. 5) to speech speed convertor 20.

Speech speed convertor 20 has a function of converting the original voice into voice, which is similar to a case where the talker speaks slowly, by expanding the voice signal on the voice reception side in a time direction. In a case where the speech speed conversion is performed and the speech speed conversion is operated and continued at a regular conversion rate, delay is generated infinitely for real time. In this case, there is a problem in that conversation is not established in a telephone in which a real-time telephone call is made. In a real-time speech speed conversion process, delay is recovered in such a way that the voice section of the voice reception is detected and the non-voice section is shortened when a speech speed at the voice section is caused to be slow. Therefore, delay from the real time is short, and an advantage of reproduction (slow reproduction) according to the speech speed conversion is acquired. Accordingly, speech speed convertor 20 is capable of preventing delay by extending the voice section and shortening the non-voice section. For example, in a case where voice of "Hello, good afternoon" is reproduced, voice "Hello" and "good afternoon" are extended to be long, and a non-voice section between "Hello" and "good afternoon" is reduced.

Slow-talk button 16 is a switch which switches between ON and OFF of speech speed convertor 20 and is freely pressed by the user. In addition, slow-talk button 16 includes indicator 16z, which turns on a light in a case where speech speed convertor 20 is ON and turns off the light in a case where speech speed convertor 20 is OFF, and repeats turning on/off the light whenever being pressed.

Indicator 16z is provided to indicate a situation of telephone 10.

Figure 3:
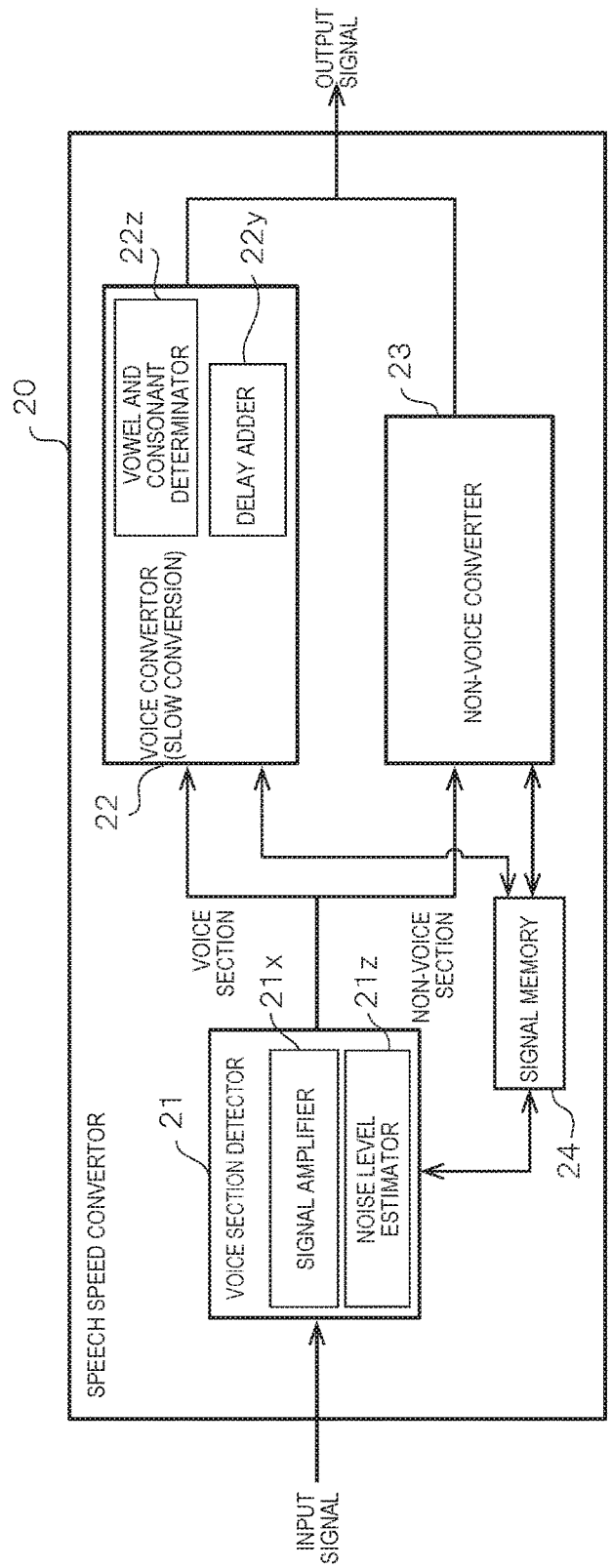
FIG. 3 is a block diagram illustrating an example of an internal configuration of a speech speed convertor in detail.

FIG. 3 is a block diagram illustrating an example of an internal configuration of speech speed convertor 20 in detail. Speech speed convertor 20 is formed to include voice section detector 21, voice convertor 22, non-voice convertor 23, and signal memory 24.

Voice section detector 21 as an example of a section detector includes noise level estimator 21z and signal amplifier 21x, and detects the voice section included in the input signal on the voice reception side.

Noise level estimator 21z estimates a level of a noise signal (that is, a noise level) around the user in the non-voice section included in the input signal on the voice reception side.

Signal amplifier 21x is used in the above-described second correction method, and amplifies the noise signal included in the input signal according to the amount of attenuation of the voice reception signal in accordance with a control signal from section detection corrector 17.

Voice convertor 22 extends the voice section and delays the voice signal. Voice convertor 22 includes vowel and consonant determinator 22z and delay adder 22y.

Vowel and consonant determinator 22z determines a vowel and a consonant included in the voice signal.

Figure 9A:
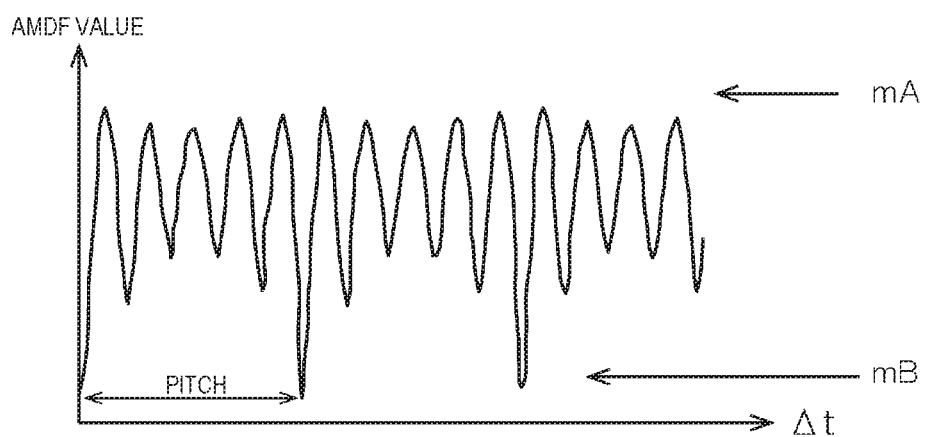
FIG. 9A is a timing chart illustrating a change in an AMDF value according to time.
Figure 9B:
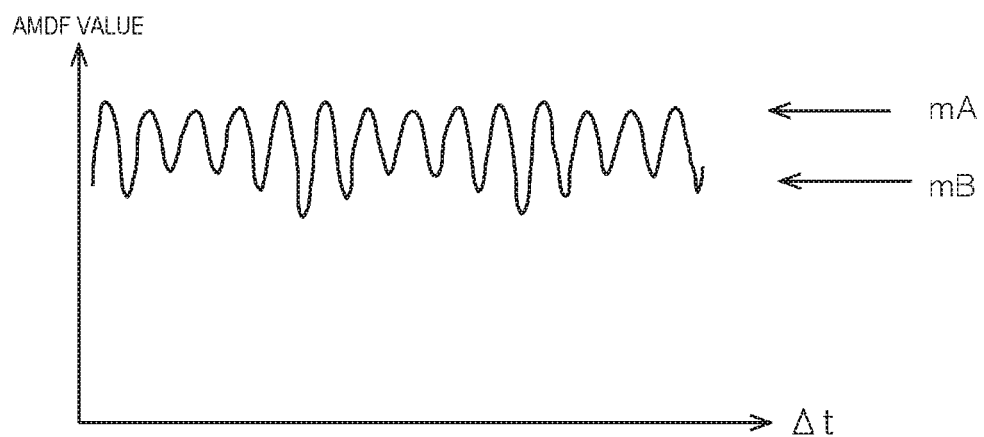
FIG. 9B is a timing chart illustrating the change in the AMDF value according to time.

Delay adder 22y delays a voice signal of the vowel (see FIG. 9A) and does not delay a voice signal of the consonant (see FIG. 9B).

Non-voice convertor 23 shortens (compresses) the non-voice section.

Signal memory 24 is a voice buffer which temporarily stores the input voice signal (input signal) and temporarily stores the voice signal (output signal) output from voice convertor 22 and non-voice convertor 23. Signal memory 24 is a small-capacity memory which is predetermined by the amount of voice data on which the speech speed conversion is performed.

Figure 4:
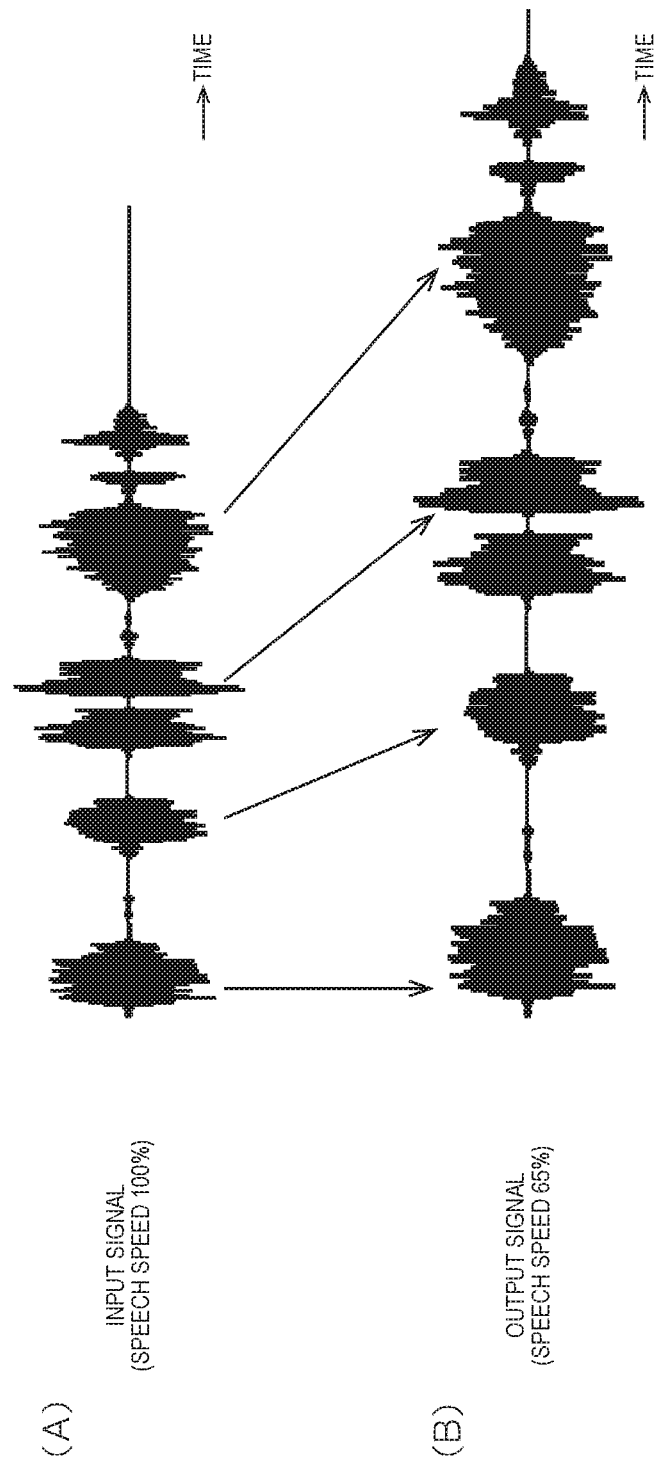
FIG. 4 is a timing chart illustrating voice signals acquired before and after the speech speed conversion is performed.

FIG. 4 is a timing chart illustrating a voice signal acquired before and after the speech speed conversion is performed. The input signal (input voice signal on the voice reception side) is a signal acquired before the speech speed conversion is performed, and a speech speed is 100%. In contrast, the output signal (voice signal acquired after the speech speed conversion) is a signal acquired after the speech speed conversion is performed and a speech speed is 65%.

As a result of the speech speed conversion, voice on the voice reception side becomes voice which is similar to a case where a talker speaks slowly to be easy to listen even though the talker speaks fast. Accordingly, the aged, the hearing-impaired, and the like are easy to listen to voice on the voice reception side.

FIG. 5 is a view illustrating a method of detecting a voice section. A result of detection of the voice section of a voice waveform on a horizontal axis illustrated on a lower side of FIG. 5, that is, a time axis is illustrated on an upper side of FIG. 5, and a time average value of the voice waveform is illustrated in a middle of FIG. 5.

In a case where voice on the voice reception side, illustrated on the lower side of FIG. 5, is input, voice section detector 21 calculates and derives the long-time average AvL and a short-time average AvS of the voice signal. Sufficiently long time, for example, three minutes, five minutes, or the like, which includes both time in which the talker talks and time in which the talker does not talk, is set for the long-time average AvL. In contrast, short time, for example, three seconds, five seconds, or the like, in which the size (volume) of voice talked by the talker can be caught, is set for the short-time average AvS.

As illustrated at the center of FIG. 5, voice section detector 21 considers the long-time average AvL of the voice signal as a noise level, and sets the long-time average AvL to a threshold which is used to determine the voice section. In addition, voice section detector 21 considers the short-time average AvS of the voice signal as a voice level. The value of the short-time average AvS becomes a large value and is changed in a case where the talker talks, compared to the value of the long-time average AvL.

As illustrated on the upper side of FIG. 5, voice section detector 21 detects a section, in which the voice level is larger than the noise level, as the voice section, and detects a section, in which the voice level is equal to or lower than the noise level, as the non-voice section. In the result of detection of the voice section illustrated on the upper side of FIG. 5, the voice section is expressed as a value 1 and the non-voice section is expressed as a value 0.

An operation of telephone 10, which includes the above-described configuration, will be described.

Figure 6:
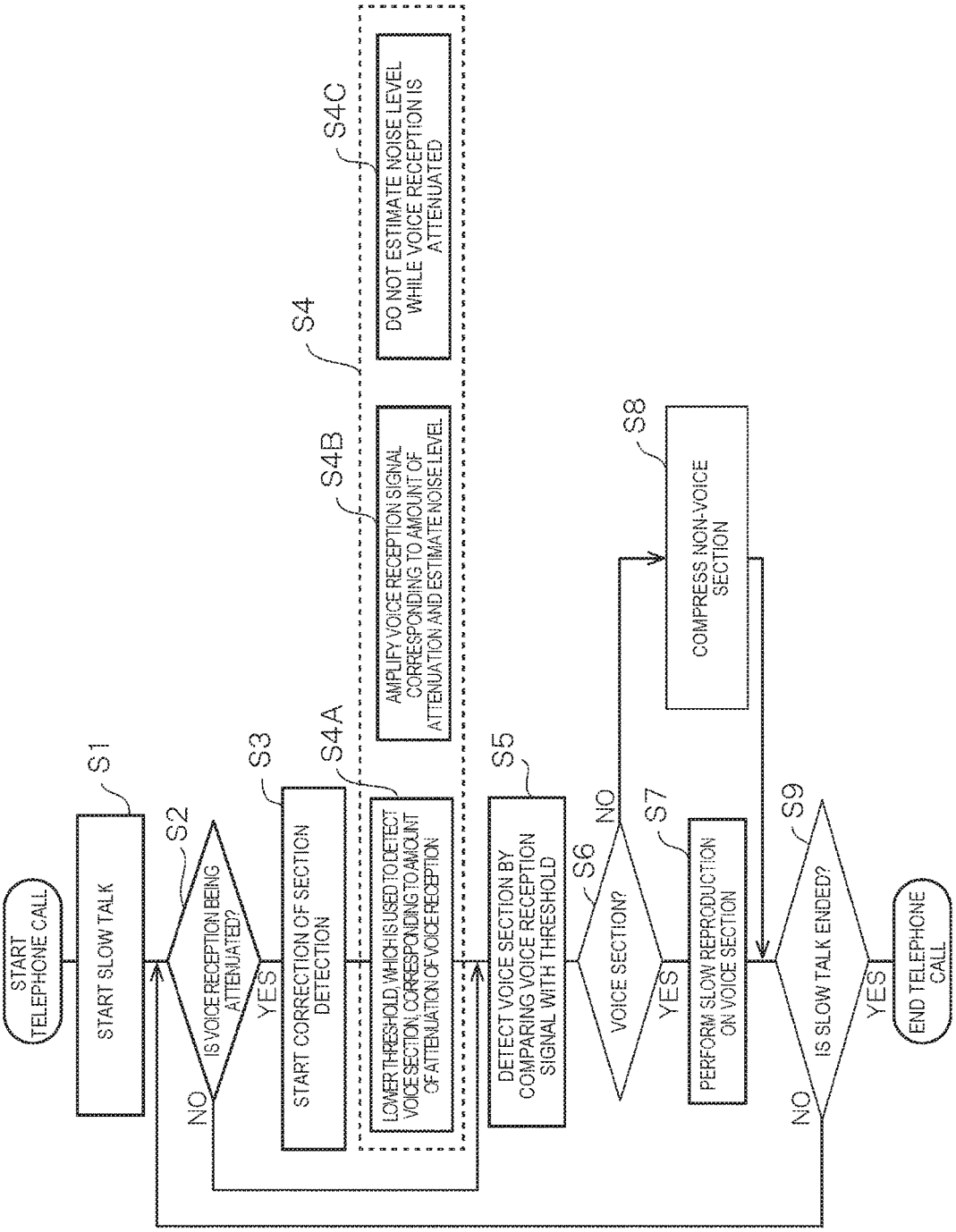
FIG. 6 is a flowchart illustrating an example of a telephone call operation procedure according to the first embodiment.

FIG. 6 is a flowchart illustrating an example of a telephone call operation procedure according to the first embodiment. In a case where telephone 10 is connected to a telephone of a telephone call partner through a public switched telephone network (public analog line), a telephone call starts.

In a case where the telephone call is being made, that is, in a case where voice is transmitted and received in real time, speech speed convertor 20 starts the speech speed conversion (slow talk) if slow-talk button 16 is pressed by the user (S1). The user is notified about start of the slow talk in such a way that indicator 16z of slow-talk button 16 turns on a light. Meanwhile, it is possible to perform setting in advance such that telephone 10 usually performs slow talk. In this case, it is possible to eliminate the slow-talk button. Furthermore, in this case, a slow-talk release button, which is freely pressed in a case where it is desired to return to normal talk, may be provided.

Voice reception gain controller 15 determines whether or not voice reception is being attenuated (S2). In a case where voice reception is being attenuated, section detection corrector 17 inputs the amount (gain) of attenuation of voice reception acquired from voice reception gain controller 15, and starts correction of voice section detection based on the amount of attenuation of voice reception (S3).

Section detection corrector 17 performs the correction of voice section detection using any one of the above-described three correction methods or the combination thereof (S4).

In the first correction method, section detection corrector 17 outputs a control signal to noise level estimator 21z such that the threshold, which is used to detect the voice section, decreases as much as the amount of attenuation of voice reception (S4A).

In the second correction method, section detection corrector 17 amplifies the voice reception signals by signal amplifier 21x as much as the amount of attenuation, and outputs the control signal to noise level estimator 21z such that the noise level is estimated using a signal acquired after amplification (S4B).

In the third correction method, section detection corrector 17 outputs the control signal to noise level estimator 21z such that the noise level is not estimated while voice reception is being attenuated (S4C). In this case, noise level estimator 21z does not estimate the noise level, and a predetermined threshold is used for the threshold which is compared with the received signal.

As described above, the first and second correction methods are available in a case where voice reception gain controller 15 is formed by the center clipper or the AGC. The third correction method is available in a case where the voice reception gain controller 15 is formed by the voice switch.

Voice section detector 21 detects the voice section by comparing the voice reception signal with the threshold (S5). As described above, the voice section is detected in a case where the long-time average AvL of the voice illustrated in FIG. 5 is larger than the short-time average AvS. Voice section detector 21 determines whether or not the voice reception side is the voice section (S6).

In a case of the voice section, voice convertor 22 extends the voice section and performs reproduction (slow reproduction) (S7). In contrast, in a case of the non-voice section, non-voice convertor 23 compresses the non-voice section (S8). Processes in steps S7 and S8 correspond to the well-known related art as described above.

After the processes in steps S7 and S8 are performed, speech speed convertor 20 determines whether or not the speech speed conversion (slow talk) ends (S9). The slow talk ends in a case where slow-talk button 16 is pressed again. Meanwhile, the slow talk may end in a case where a slow-talk release button is provided and the slow-talk release button is pressed or in a case where the telephone call ends by on hook.

In a case where the slow talk does not end, speech speed convertor 20 returns to step S2 and repeats similar processes. In contrast, in a case where the slow talk ends, speech speed convertor 20 ends the operation. In a case where the slow talk ends, the slow-talk button 16 turns off the light.

Figure 7A:
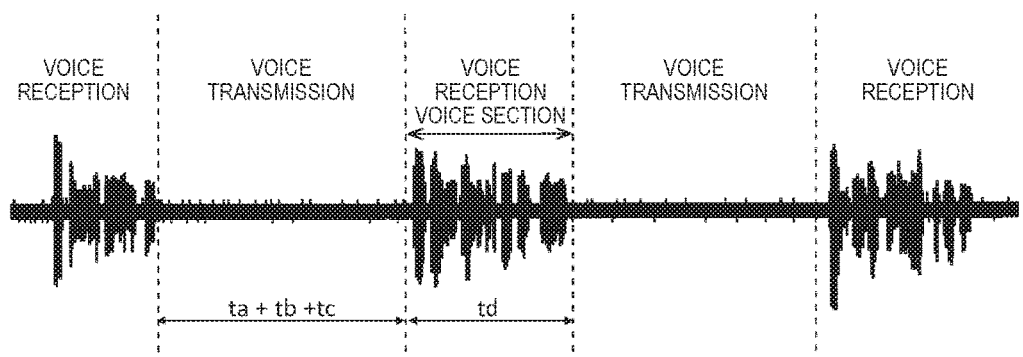
Figure 7B:
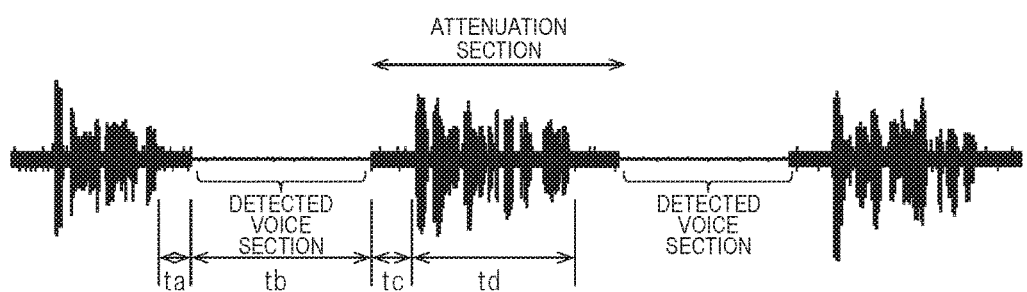

The received voice, acquired in a case where the voice switch is used as voice reception gain controller 15, will be described. FIGS. 7A and 7B are timing charts illustrating a change in the received voice acquired before and after the voice switch is turned on. FIG. 7A is a timing chart illustrating a signal waveform of the received voice acquired in a case where the voice switch is turned off. In voice transmission (for example, ta+tb+tc of FIG. 7A) before and after the voice section of voice reception (for example, td of FIG. 7A), noise is generated due to line echo.

FIG. 7B is a timing chart illustrating a signal waveform of the received voice acquired after the voice switch is turned on. As described above, the voice switch determines whether or not voice transmission exists, switches between voice transmission and voice reception, and attenuates the voice reception signal in a case where voice transmission exists. In a case where the voice switch is turned on, the voice switch is turned on in a period (a period tb of FIG. 7B) during which voice transmission exists after voice reception is performed, and the noise signal on the voice reception side is reduced. However, the voice switch is turned off in a period in which voice transmission is being performed or in a period until voice reception starts after voice transmission ends, that is, in a period in which neither voice transmission nor voice reception exists (periods ta and tc of FIG. 7B). The noise signal fluctuates largely in a case where the voice switch is turned off, and voice section detector 21 erroneously detects noise as voice on the voice reception side in a case where the noise signal suddenly becomes large (rises). As a result, voice section detector 21 detects a period, which is longer than an actual voice section of voice reception, as the voice section.

Section detection corrector 17 according to the embodiment performs correction of voice section detection such that the periods ta and tc are not included in the voice section using the above-described first, second, or third correction method, and acquires an accurate voice section (period td in FIGS. 7A and 7B).

Figure 8A:
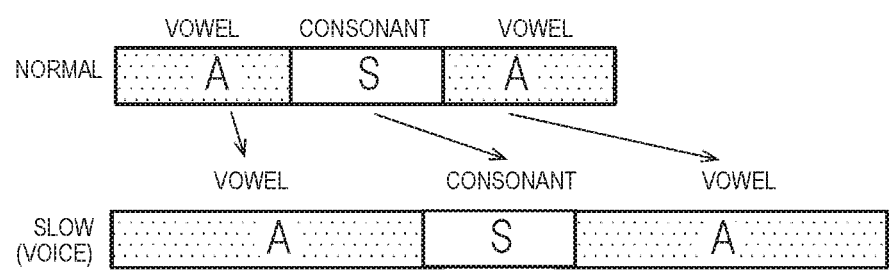
FIG. 8A is a view illustrating a speech speed conversion method for voice which includes a vowel and a consonant.
Figure 8B:
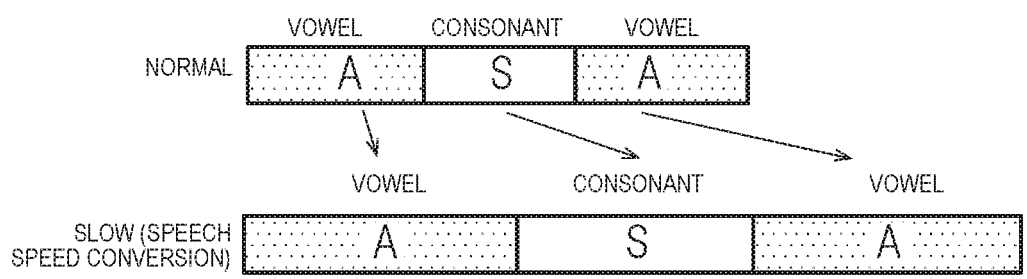
FIG. 8B is a view illustrating the speech speed conversion method for the voice which includes the vowel and the consonant.

Subsequently, a case where the speech speed conversion is performed on voice, which includes a vowel and a consonant, while distinguishing the vowel from the consonant will be described. FIGS. 8A and 8B are views illustrating a speech speed conversion method for the voice which includes the vowel and the consonant. Normally, voice includes a vowel and a consonant in many cases. For example, a case where voice of "ASA" (Japanese language which means "morning" in English) is spoken slowly will be described as an example. "ASA" is acquired in a case where the voice of "ASA" is expressed by Alphabets so as to be easily distinguish by a vowel and a consonant, "A" is a vowel, "S" is a consonant, and "A" is a vowel.

As illustrated in FIG. 8A, in a case where the voice is spoken slowly compared to a case where the voice is spoken normally, there is a tendency that the consonant "S" is not much extended and the vowel "A" is extended to be long. The speaking voice is natural voice. In contrast, in a case where speech speed convertor 20 evenly expands voice without distinguishing between the consonant and the vowel as illustrated in FIG. 8B, discomfort which is different from the natural voice occurs.

In the embodiment, speech speed convertor 20 calculates degrees of an original feature of the vowel and an original feature of the consonant of the voice section using an Average Magnitude Deference function (AMDF) value, and performs conversion on a speech speed such that the speech speed of a vowel section is slower than the speech speed of a consonant section. The AMDF value is calculated by speech speed convertor 20 in order to acquire a fundamental period (repetition period) of the voice. In detection of the fundamental period of the voice, a degree of correlation (auto-correlation value) between the waveform and a waveform acquired by shifting time is acquired, and an interval (pitch) which has the strongest correlation is acquired. Although a method using integration and subtraction of signals is provided for calculation of the auto-correlation, the AMDF value is acquired using subtraction (difference), in which the amount of subtraction is relatively small, in the embodiment.

FIGS. 9A and 9B are timing charts illustrating a change in the AMDF value according to time. A vertical axis indicates the AMDF value and a horizontal axis indicates time difference ($\Delta t$). FIG. 9A illustrates the change in the AMDF value according to time in the vowel section. In the vowel section, a periodicity of the voice signal is strong as illustrated in FIG. 9A. In the consonant section, the periodicity of the voice signal is weak as illustrated in FIG. 9B. As the periodicity of the signal is strong, a minimum value of the ADMF value becomes small and appears as a peak. However, a maximum value of the ADMF value is not changed.

Accordingly, as shown in Equation (1), the original feature of the vowel is expressed by a variable X. Speech speed convertor 20 determines that the section has the original feature of the vowel as the variable X is small and is close to the value 0.

$$X = \text{minimum value } mB \text{ of AMDF value/maximum value } mA \text{ of AMDF value} \quad (1)$$

Speech speed convertor 20 performs the speech speed conversion such that a section, which has the small variable X, becomes slow voice and unaffected voice which is close to the natural voice. Here, speech speed convertor 20 continuously changes the variable X such that, the smaller the value of the variable, the larger the amount of delay. However, speech speed convertor 20 may distinguish between the vowel and the consonant by setting a threshold Th1 and comparing the variable X with the threshold Th1. That is, in a case where variable X<Th1, speech speed convertor 20 may determine a vowel. In a case where the amount of delay increases and thus variable X≥Th1, speech speed convertor 20 may determine a consonant and may set the amount of delay to a value 0 or smaller.

In addition, a ratio of the minimum value mB of the AMDF value to the maximum value mA of the AMDF value is used as the variable X. However, an absolute value of difference between the minimum value mB of the AMDF value and the maximum value mA of the AMDF value may be used. In this case, distinguishment between the vowel and the consonant may be performed by comparing the variable X, which is expressed by the absolute value of difference, with a threshold Th2. That is, in a case where variable X>Th2, speech speed convertor 20 determines the vowel. In a case where the amount of delay increases and thus variable X≤Th2, speech speed convertor 20 determines the consonant, and the amount of delay may be set to a value 0 or smaller.

As described above, it is possible to perform the speech speed conversion on the voice, which includes a vowel and a consonant, such that the voice becomes close to natural voice. In addition, since the speech speed conversion is not performed on a consonant, it is possible to realize the speech speed conversion with a small amount of operation.

Meanwhile, voice is not limited to a combination of the vowel and the consonant, and includes voice which has only the consonant, for example, "ng" (in Japanese language)". In addition, in the embodiment, a case where voice is spoken in Japanese language is described. However, it is possible to apply the present disclosure to a case where voice is spoken in a foreign language such as English or German, similarly.

As described above, telephone 10A (telephone apparatus) according to the first embodiment makes a telephone call with telephone 10B (another telephone apparatus) through telephone switching network 7. Microphone 11 collects transmitted voice of the user. Noise level estimator 21z estimates a level of a noise signal around the user. Voice section detector 21 detects the voice section of the voice included in a signal transmitted from telephone 10B. Voice reception gain controller 15 attenuates the voice reception signal, which includes the line echo components of the voice transmission signal, based on telephone switching network 7 while the transmitted voice of the user is collected by microphone 11. Section detection corrector 17 (threshold corrector) corrects the threshold used for the voice section detection in voice section detector 21 based on the amount of attenuation of the voice reception signal by voice reception gain controller 15 and the level of the noise signal estimated by noise level estimator 21z. Voice convertor 22 (speech speed convertor) performs the speech speed conversion on the voice included in the signal transmitted from telephone 10B and outputs resulting voice from speaker 12 based on the threshold acquired after correction is performed by section detection corrector 17.

Therefore, it is possible to prevent the voice section from being erroneously detected and to perform the speech speed conversion such that the user is easy to listen. In addition, as a result of the speech speed conversion, voice on the voice reception side becomes voice which is similar to a case where being slowly talked to easy to listen even though the talker speaks fast. Accordingly, the aged, the hearing-impaired, and the like are easy to listen to the voice on the voice reception side.

In addition, voice reception gain controller 15 is the center clipper. Section detection corrector 17 outputs a signal to noise level estimator 21z so as to decrease the threshold corresponding to the amount of attenuation of the voice reception signal by voice reception gain controller 15. Voice section detector 21 detects a period, which exceeds the threshold in which the voice reception signal is corrected, as the voice section.

Therefore, in a case where the center clipper is used, it is possible to adjust the level of the attenuated received signal to threshold. Accordingly, the voice section detection becomes accurate.

In addition, voice reception gain controller 15 is the auto gain control (AGC). Section detection corrector 17 outputs a signal to noise level estimator 21z so as to decrease the threshold corresponding to the amount of attenuation of the voice reception signal by voice reception gain controller 15. Voice section detector 21 detects a period, which exceeds the threshold in which the voice reception signal is corrected, as the voice section.

Therefore, in a case where the auto gain control is used, it is possible to adjust the level of the attenuated received signal to threshold. Accordingly, the voice section detection becomes accurate.

In addition, voice reception gain controller 15 is the voice switch. While the voice reception signal is being attenuated by voice reception gain controller 15, signal amplifier 21x amplifies the voice reception signal corresponding to the amount of attenuation, and noise level estimator 21z estimates the level of the noise signal acquired after amplification.

Therefore, in a case where the voice switch is used, it is possible to adjust the level of the attenuated received signal to threshold. Accordingly, the voice section detection becomes accurate.

In addition, voice reception gain controller 15 is the voice switch. While the voice reception signal is being attenuated by voice reception gain controller 15, noise level estimator 21z stops to estimate the level of the noise signal. Voice section detector 21 detects a period, in which the voice reception signal exceeds the predetermined threshold, as the voice section. Therefore, even in a case where the voice reception signal is sporadically attenuated, the voice section detection is performed.

In addition, telephone 10A includes slow-talk button 16 that instructs to start the speech speed conversion. In a case where it is instructed to start the speech speed conversion by slow-talk button 16, speech speed convertor 20 performs the speech speed conversion on voice included in the signal transmitted from telephone 10B.

Therefore, it is possible for the user to start the speech speed conversion in arbitrary timing, for example, in a case where it is determined that it is difficult to listen to speaking voice of the telephone call partner.

In addition, slow-talk button 16 includes indicator 16z. In a case where it is instructed to start the speech speed conversion by slow-talk button 16, indicator 16z turns on a light. Therefore, it is possible for the user to easily know that the speech speed conversion is being performed.

Details and Problem of Second Embodiment

Speech speed conversion is performed in such a way that an input voice signal (input signal) is once accumulated in a signal memory and a past signal is read at a speed which is slow compared to the input signal.

In a case where a speech speed conversion device is mounted on a telephone with an automatic answering function and in a case where an automatic answering telephone message accumulated as automatic answering is reproduced at a slow speed, an idle capacity of the signal memory (voice buffer) of a speech speed convertor is ran out if the automatic answering telephone message is long. That is, in a case where the speech speed conversion is continued for a long time, delay between input and output increases, and thus the idle capacity of the signal memory is ran out.

As a result, it is difficult to perform the speech speed conversion until the idle capacity of the signal memory increases, and thus the advantage of the speech speed conversion decreases. In such a case, for example, a user listens to voice reception at a normal reproduction speed without performing the speech speed conversion from the middle, and thus the user becomes hard to listen and feels discomfort for a change in the voice speed of the voice reception. Particularly, in a case where the user listens to the automatic answering by voice, there is a case in which the automatic answering voice is provided for a long time depending on an issue. Therefore, it is assumed that the idle capacity of the signal memory decreases, and thus the above situation is easily generated. In contrast, in a case where the capacity of the signal memory increases, the costs rise.

Here, in a second embodiment, an example of a telephone apparatus, which is capable of performing the speech speed conversion on long-time automatic answering voice even though the signal memory has a small capacity, will be described.

Second Embodiment

A telephone apparatus according to the second embodiment has approximately the same configuration as in the first embodiment. The same reference symbols are given to the same components as in the first embodiment, and the description thereof will not be repeated.

Figure 10:
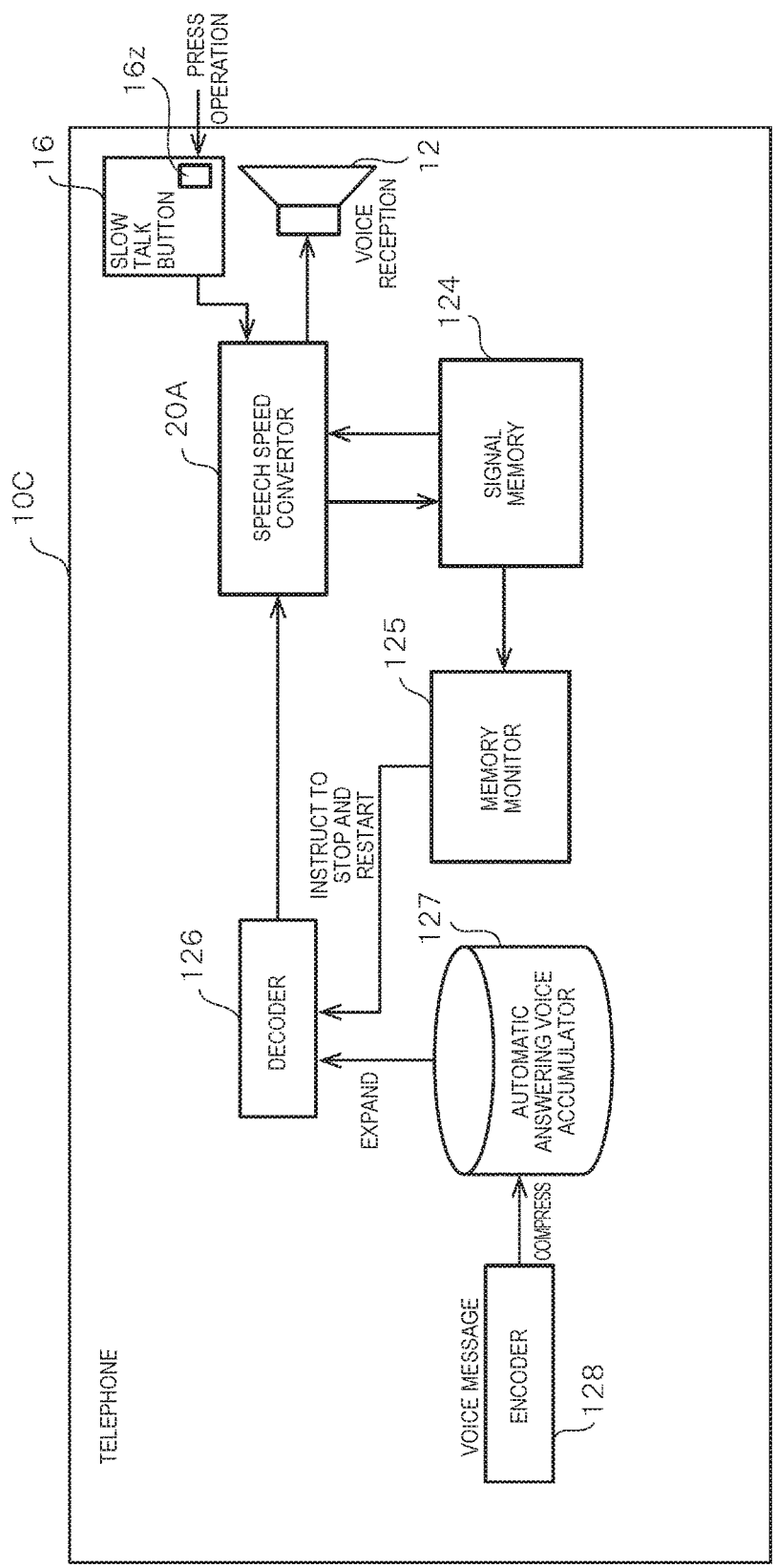
FIG. 10 is a diagram illustrating an example of an internal configuration of components, which are related to speech speed conversion, of a telephone according to a second embodiment in detail.

FIG. 10 is a diagram illustrating an example of an internal configuration of components, which are related to the speech speed conversion, of telephone 10C according to the second embodiment in detail. Telephone 10C is a telephone apparatus with a telephone answering machine (TAM) function capable of reproducing an automatic answering telephone message by an operation performed by the user, and includes speech speed convertor 20A, speaker 12, signal memory 124, memory monitor 125, decoder 126, automatic answering voice accumulator 127, and encoder 128.

Signal memory 124 is a voice buffer that temporarily stores a voice signal (input signal) which is input to speech speed convertor 20A, and, in addition, temporarily stores a voice signal (output signal) which is output from speech speed convertor 20A. Signal memory 124 is a small-capacity memory which is predetermined based on the amount of voice data on which the speech speed conversion is performed. Meanwhile, signal memory 124 may be provided on an inside of speech speed convertor 20A or may be provided on an outside as in the embodiment.

Speech speed convertor 20A has the same configuration as in the first embodiment except signal memory 124. Speaker 12 outputs automatic answering voice which is reproduced.

Automatic answering voice accumulator 127 accumulates the automatic answering telephone message, and includes a relatively large-capacity storage area such as a hard disk or a memory card. Encoder 128 compresses the automatic answering telephone message, which is accumulated in automatic answering voice accumulator 127, using a prescribed voice compressing method. MPEG Audio Layer3 (MP3), Advanced Audio Coding (AAC), Windows Media Audio (WAV), or the like may be considered as the voice compressing method. Decoder 126 reads the automatic answering telephone message accumulated in automatic answering voice accumulator 127, and expands the automatic answering telephone message using a voice expanding method corresponding to encoder 128.

Memory monitor 125 monitors the idle capacity of signal memory 124, provides an instruction to stop to read the automatic answering telephone message to decoder 126 in a case where the idle capacity of signal memory 124 decreases, that is, a consumption rate (use rate) of signal memory 124 exceeds an upper limit threshold Sh1, and provides an instruction to restart to read the voice message to decoder 126 in a case where the idle capacity of signal memory 124 increases, that is, the consumption rate of signal memory 124 is lower than a lower limit threshold Sh2. Here, the upper limit threshold Sh1 is set to a value in which the idle capacity of signal memory 124 is close to a predetermined lower limit value. In addition, the lower limit threshold Sh2 is set to a value in which the idle capacity of signal memory 124 is closed to a predetermined upper limit value.

Figure 11:
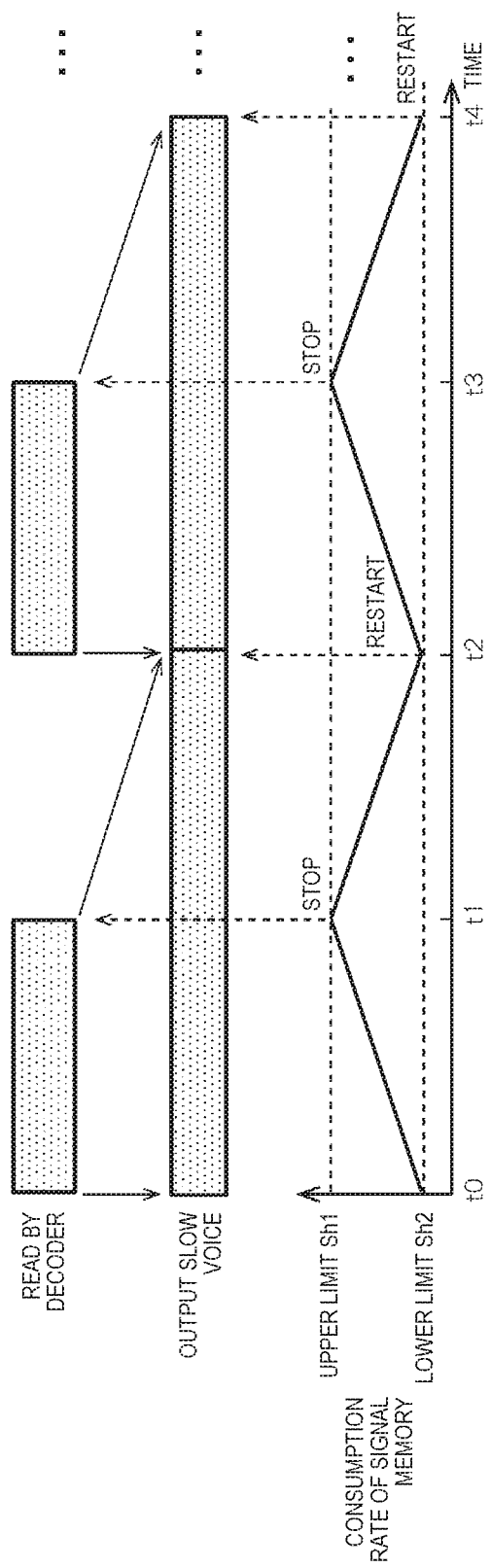
FIG. 11 is a timing chart illustrating an example of a change in a state of each unit of the telephone.

FIG. 11 is a timing chart illustrating an example of a change in a state of each unit of telephone 10C. The timing chart illustrates changes in reading performed by decoder 126, a slow voice output, and a consumption rate (use rate) of signal memory 124 according to time.

In a case where, at timing t0, decoder 126 reads the automatic answering telephone message and slow voice is output in such a way that speech speed convertor 20A performs the speech speed conversion, the consumption rate of signal memory 124 rises. In a case where, at timing t1, the consumption rate of signal memory 124 exceeds the upper limit threshold Sh1 (for example, a value which is close to a predetermined upper limit value that is set to approximately 20% of a maximum capacity), memory monitor 125 causes decoder 126 to stop to read the automatic answering telephone message accumulated in automatic answering voice accumulator 127. While reading of the automatic answering telephone message is being stopped, speech speed convertor 20A performs the speech speed conversion and outputs slow voice.

Thereafter, in a case where the consumption rate of signal memory 124 is gradually lowered, and, at timing t2, is lower than the lower limit threshold Sh2 (for example, a value which is close to a predetermined lower limit value that is set to approximately 80% of the maximum capacity), memory monitor 125 causes decoder 126 to restart to read the automatic answering telephone message accumulated in automatic answering voice accumulator 127.

Therefore, the slow voice is output without interruption, and thus it is possible for speech speed convertor 20A to perform the speech speed conversion on the automatic answering voice for a long time even in a case of signal memory 124 which has a small capacity. In addition, in a case where the upper limit threshold Sh1 and the lower limit threshold Sh2 are set and setting is performed such that the lower limit threshold Sh2 is wider than the upper limit threshold Sh1, it is possible to restart the speech speed conversion after the idle capacity of signal memory 124 is sufficiently restored, and thus it is possible to prevent the idle capacity from being remarkably small in the middle of the speech speed conversion. Accordingly, an operation of the speech speed conversion is stable. In addition, it is possible to reduce loads of a process caused by frequent repetition of stopping and restarting of decoder 126.

Figure 12:
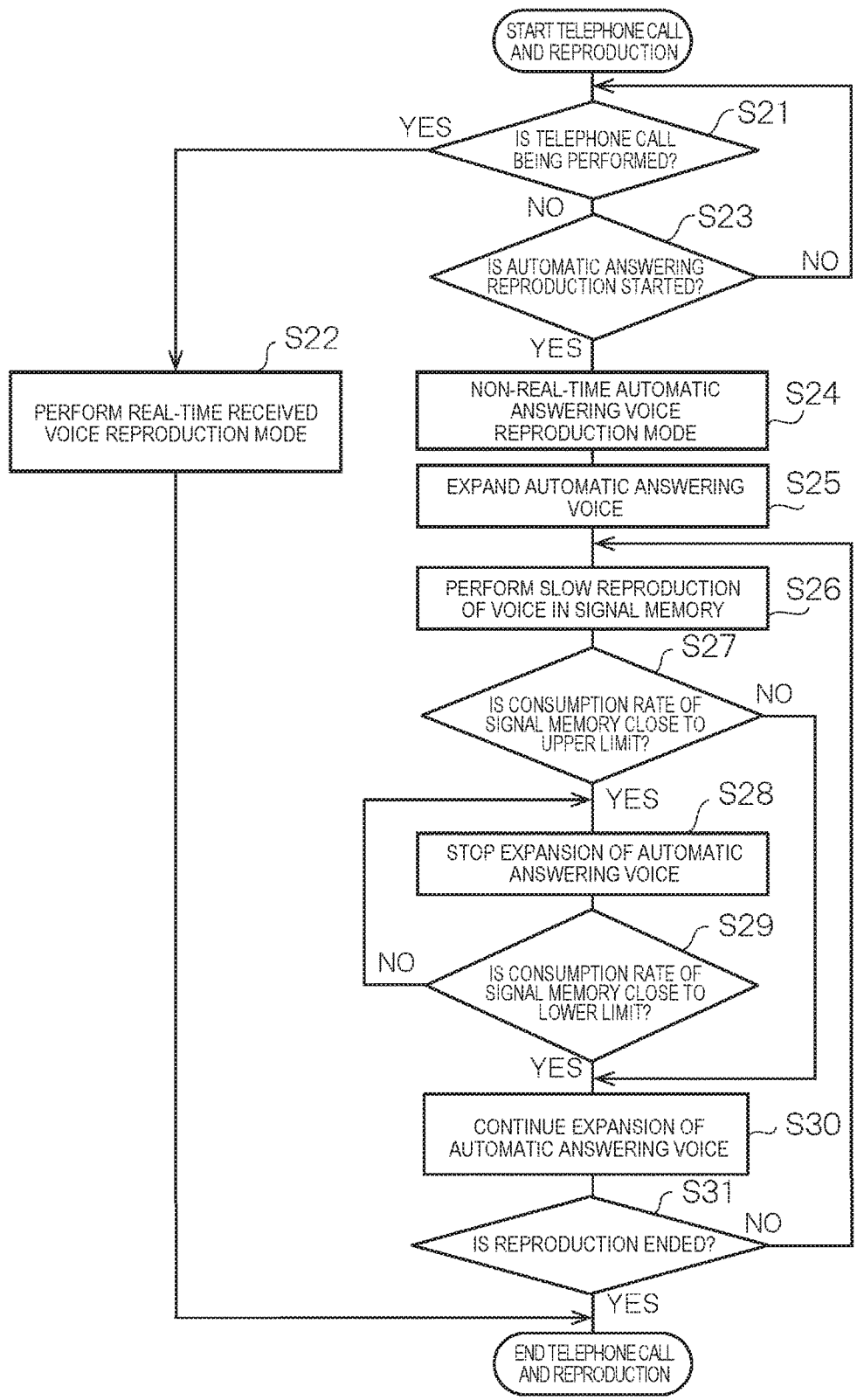
FIG. 12 is a flowchart illustrating an example of a procedure of a telephone call and reproduction operation according to the second embodiment.

FIG. 12 is a flowchart illustrating an example of a procedure of a telephone call and reproduction operation according to the second embodiment. Telephone 10C determines whether or not a telephone call is being made (S21). In a case where a telephone call is being made, telephone 10C performs a real-time received voice reproduction mode, and performs the speech speed conversion similarly to the first embodiment (S22). Since the speech speed conversion performed in step S22 is described in detail in the first embodiment, the description thereof will not be repeated.

In contrast, in a case where a telephone call is not being made in step S21, telephone 10C determines whether or not the automatic answering telephone message is reproduced (S23). In a case where the automatic answering telephone message is not reproduced, telephone 10C returns to the process in step S21.

In addition, in a case where the automatic answering telephone message is reproduced, telephone 10C transitions to a non-real-time automatic answering voice reproduction mode, that is, a slow automatic answering telephone message reproduction mode (S24). Meanwhile, in a case of non-real-time reproduction (automatic answering telephone message reproduction) according to the second embodiment, the slow reproduction is also performed on the non-voice section. Meanwhile, similarly to the first embodiment, the slow reproduction may not be performed on the non-voice section. In a case where the slow reproduction is not performed on the non-voice section, it is possible to rapidly decrease the consumption rate of the signal memory. In addition, it is possible to perform the speech speed conversion such that the user is easy to listen.

Decoder 126 reads the automatic answering telephone message from automatic answering voice accumulator 127, expands the automatic answering telephone message, and stores the automatic answering telephone message acquired after expansion in signal memory 124 (S25).

Speech speed convertor 20A performs the speech speed conversion and performs reproduction (performs slow reproduction) on the automatic answering telephone message in signal memory 124 (S26). Memory monitor 125 determines whether or not the consumption rate of signal memory 124 exceeds the upper limit threshold Sh1 and thus the idle capacity becomes small (S27). In a case where the consumption rate of signal memory 124 does not exceed the upper limit threshold Sh1, decoder 126 continues to read the automatic answering telephone message (S30).

In contrast, in a case where the consumption rate of signal memory 124 exceeds the upper limit threshold Sh1, memory monitor 125 causes decoder 126 to stop to read the automatic answering telephone message (S28). Furthermore, memory monitor 125 determines whether or not the consumption rate of signal memory 124 is lower than the lower limit threshold Sh2 and thus the idle capacity increases (S29).

In a case where the consumption rate of signal memory 124 is not lower than the lower limit threshold Sh2, memory monitor 125 returns to the process in step S28. In contrast, in a case where the consumption rate of signal memory 124 is lower than the lower limit threshold Sh2, decoder 126 restarts to read the automatic answering telephone message in step S30.

Furthermore, telephone 10C determines whether or not to end reproduction of the automatic answering (S31). In a case where the reproduction of the automatic answering does not end, the process returns to step S26, and speech speed convertor 20A performs the speech speed conversion and the reproduction. In contrast, in a case where the reproduction ends because a button is manipulated or whole automatic answering telephone messages of automatic answering voice accumulator 127 are completely reproduced, telephone 10C ends the operation.

As described above, telephone 10C (telephone apparatus) according to the second embodiment makes a telephone call with telephone 10B (another telephone apparatus) through telephone switching network 7. Encoder 128 (compressor) compresses telephone call voice transmitted from telephone 10B. Automatic answering voice accumulator 127 (automatic answering telephone message preserver) preserves the telephone call voice compressed by encoder 128 as the automatic answering telephone message. Decoder 126 (expander) expands the telephone call voice preserved by automatic answering voice accumulator 127. Signal memory 124 (voice buffer) temporarily maintains the telephone call voice expanded by decoder 126. Speech speed convertor 20 performs the speech speed conversion on the telephone call voice which is read from signal memory 124, and outputs resulting voice from speaker 12. Memory monitor 125 (monitor) causes decoder 126 to temporarily stop to expand the telephone call voice in a case where it is determined that the idle capacity of signal memory 124 approaches the predetermined lower limit value.

Therefore, even though signal memory 124 has a small capacity, it is possible to perform the speech speed conversion on the long-time automatic answering voice.

In addition, in a case where memory monitor 125 determines that the idle capacity of signal memory 124 approaches the predetermined upper limit value, memory monitor 125 causes decoder 126 to restart to expand the telephone call voice. As described above, in a case where the idle capacity of the voice buffer increases, expansion of the telephone call voice is restarted, and thus it is possible to perform the speech speed conversion without interruption.

In addition, the predetermined lower limit value is approximately 20% of the maximum capacity of signal memory 124. In a case where expansion of the telephone call voice is temporarily stopped at approximately 20% of the maximum capacity, it is possible for the voice buffer to have a margin, and thus the operation of the speech speed conversion is stable.

In addition, telephone 10C includes slow-talk button 16 which instructs to start the speech speed conversion. In a case where it is instructed to start the speech speed conversion by slow-talk button 16, speech speed convertor 20A performs the speech speed conversion on the voice included in the signal transmitted from telephone 10B.

Therefore, it is possible for the user to start the speech speed conversion at an arbitrary timing, for example, when it is determined that it is difficult to listen to the speaking voice of the telephone call partner.

In addition, slow-talk button 16 includes indicator 16z. In a case where it is instructed to start the speech speed conversion by slow-talk button 16, indicator 16z turns on a light. Therefore, it is possible for user to easily know that the speech speed conversion is performed.

Meanwhile, in the second embodiment, it is possible to perform the speech speed conversion on voice which includes a vowel and a consonant by distinguishing between the vowel and the consonant, similarly to the first embodiment.

Hereinbefore, although various embodiments are described with reference to the drawings, it is apparent that the present disclosure is not limited to the examples. It is apparent that those skilled in the art may perceive various changes or modifications in categories disclosed in claims, and it is understood that the changes or modifications naturally belong to the technical range of the present disclosure.

What is claimed is:

1. A communication apparatus mounted with a speech speed conversion device, comprising:
    an encoder that compresses telephone call voice data which is transmitted from another communication apparatus;
    a message preserver that preserves the telephone call voice data, which is compressed by the encoder, as a message;
    a decoder that expands the telephone call voice data which is preserved by the message preserver;
    a speech speed convertor that includes a voice data buffer which temporarily maintains the telephone call voice data expanded by the decoder, and that performs speech speed conversion on the telephone call voice data which is read from the voice data buffer, and outputs resulting voice from a speaker; and
    a monitor that temporarily stops to expand reading of the telephone call voice data by the decoder in a case where the monitor determines that an idle capacity of the voice data buffer becomes less than a predetermined lower limit value,
    wherein the speech speed convertor continues to perform speech speed conversion on the telephone call voice data that is already read by the decoder and stored in the voice data buffer, and outputs the resulting voice from the speaker while the monitor temporarily stops reading of the telephone call voice data by the decoder.

2. The communication apparatus of claim 1, wherein, in a case where the monitor determines that the idle capacity of the voice data buffer becomes more than a predetermined upper limit value, the monitor restarts expanding of the telephone call voice data by the decoder.

3. The communication apparatus of claim 1, wherein the predetermined lower limit value is approximately 20% of a maximum capacity of the voice data buffer.

4. The communication apparatus of claim 1, further comprising:
    a button that instructs to start performing the speech speed conversion,
    wherein, in a case where the button instructs to start to perform performing the speech speed conversion, the speech speed convertor performs the speech speed conversion on the telephone call voice data, wherein the telephone call voice data is included in a signal transmitted from another telephone the other communication apparatus.

5. The communication apparatus of claim 4, further comprising:
    an indicator that indicates a situation of the telephone communication apparatus, wherein, in a case where it is instructed the button instructs to start to perform performing the speech speed conversion by the button, the indicator turns on a light.

* * * * *